(12) United States Patent
Fan et al.

(10) Patent No.: US 12,464,276 B2
(45) Date of Patent: Nov. 4, 2025

(54) SMART HEADPHONE SYSTEM AND METHOD

(71) Applicant: Rutgers, The State University of New Jersey, New Brunswick, NJ (US)

(72) Inventors: Xiaoran Fan, New Brunswick, NJ (US); Richard Howard, New Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 214 days.

(21) Appl. No.: 17/925,659

(22) PCT Filed: May 24, 2021

(86) PCT No.: PCT/US2021/033873
§ 371 (c)(1),
(2) Date: Nov. 16, 2022

(87) PCT Pub. No.: WO2021/237206
PCT Pub. Date: Nov. 25, 2021

(65) Prior Publication Data
US 2023/0283940 A1 Sep. 7, 2023

Related U.S. Application Data

(60) Provisional application No. 63/029,016, filed on May 22, 2020.

(51) Int. Cl.
*H04R 1/10* (2006.01)
*A61B 5/00* (2006.01)
(Continued)

(52) U.S. Cl.
CPC ......... *H04R 1/1041* (2013.01); *A61B 5/6817* (2013.01); *G06F 3/017* (2013.01);
(Continued)

(58) Field of Classification Search
CPC .. H04R 1/021; H04R 1/028; H04R 2201/029; H04R 5/02; H04R 9/06; H04R 1/406;
(Continued)

(56) References Cited

U.S. PATENT DOCUMENTS 3,004,216 A    10/1961  Hauf
3,033,940 A *  5/1962  Cox ........................ H04M 3/56
                                                    379/35
(Continued)

FOREIGN PATENT DOCUMENTS

EP    0620691 A1   10/1994
EP    1475988 A1   11/2004
(Continued)

OTHER PUBLICATIONS

European Supplementary European Search Report corresponding EP Application No. 21809291, dated Mar. 20, 2024.
(Continued)

*Primary Examiner* — Lun-See Lao
(74) *Attorney, Agent, or Firm* — Meagher Emanuel Laks Goldberg & Liao, LLP

(57) ABSTRACT

Various embodiments comprise systems, methods, architectures, mechanisms and apparatus providing a sensing platform wherein one or more headphone drivers are used as a versatile sensor to receive excitation signals therefrom indicative of direct or indirect pressures associated with the ear canal acoustically cooperating with the diaphragms operatively coupled to the drivers.

26 Claims, 12 Drawing Sheets

(51) Int. Cl.
*A61B 5/117* (2016.01)
*G06F 3/01* (2006.01)
*G06F 21/32* (2013.01)
*G10L 15/22* (2006.01)
*H04R 9/06* (2006.01)
*H04R 29/00* (2006.01)

(52) U.S. Cl.
CPC .............. *G06F 21/32* (2013.01); *G10L 15/22* (2013.01); *H04R 1/1075* (2013.01); *H04R 9/06* (2013.01); *H04R 29/001* (2013.01); *A61B 5/117* (2013.01)

(58) Field of Classification Search
CPC .... H04R 9/047; H04R 9/08; H04R 2231/003; H04R 2307/021; H04R 2307/204; H04R 2400/01; H04R 2400/11; H04R 2499/01; H04R 31/00; H04R 9/02; H04R 9/041; H04R 9/046; H04R 1/1041; H04R 1/1075; H04R 1/26; H04R 1/2834; H04R 1/30; H04R 2201/107; H04R 2307/207; H04R 29/001; H04R 5/033; H04R 5/04; H04R 7/20; G10L 15/22; G10L 2021/02165; G10L 21/0208; H04M 1/19; H04M 1/6008; H04M 1/605
USPC ............................................. 381/74, 120, 332
See application file for complete search history.

(56) References Cited

U.S. PATENT DOCUMENTS

| | | | |
|---|---|---|---|
| 3,826,973 A | 7/1974 | Pflaum | |
| 5,493,620 A * | 2/1996 | Pulfrey | H04R 3/12 381/96 |
| 5,787,187 A | 7/1998 | Bouchard et al. | |
| 12,053,426 B2 * | 8/2024 | Owen | A61H 23/0245 |
| 2003/0219135 A1 * | 11/2003 | Morimoto | H04S 1/00 381/117 |
| 2004/0228494 A1 * | 11/2004 | Smith | A61B 7/04 600/528 |
| 2012/0027239 A1 | 2/2012 | Akino | |
| 2014/0363003 A1 | 12/2014 | Kupershmidt | |
| 2016/0029137 A1 | 1/2016 | Price | |
| 2017/0347179 A1 | 11/2017 | Masaki et al. | |
| 2019/0357777 A1 | 11/2019 | LeBoeuf et al. | |
| 2020/0128345 A1 * | 4/2020 | Calisi | G10K 11/1752 |
| 2021/0219051 A1 * | 7/2021 | Goldstein | G10K 11/17819 |

FOREIGN PATENT DOCUMENTS

| | | |
|---|---|---|
| EP | 3145216 A1 | 3/2017 |
| JP | H02250596 A | 10/1990 |
| JP | 2016021605 A | 2/2016 |
| WO | 2018198310 A1 | 11/2018 |

OTHER PUBLICATIONS

International Search Report and Written Opinion for corresponding PCT Application No. PCT/US2021/033873, dated Sep. 10, 2021.
Japanese Office Action for corresponding Japanese Application No. 2022-570287, dated Apr. 1, 2025.
Korean Notice of Preliminary Rejection for corresponding KR Application No. 10-2022-7041386, dated May 30, 2025.

* cited by examiner

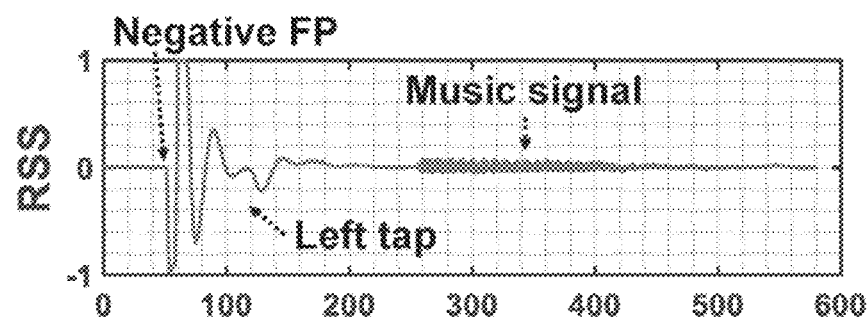
FIG. 8A
FIG. 8B
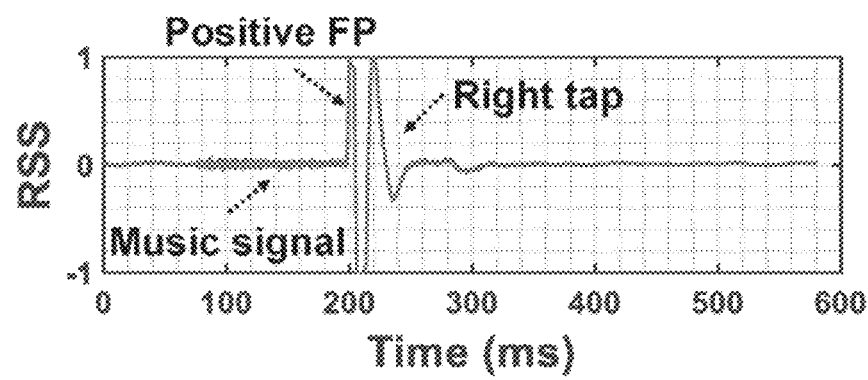
FIG. 8C
FIG. 8D

SMART HEADPHONE SYSTEM AND METHOD

CROSS-REFERENCE TO RELATED APPLICATION(S)

This application claims the benefit of U.S. Provisional Patent Application Ser. No. 63/029,016 filed May 22, 2020, which Application is incorporated herein by reference in its entirety.

FIELD OF THE DISCLOSURE

The present disclosure generally relates to headphones and, in particular, to sensing diaphragm-pressure excitation energy received from headphones and to support additional headphone functions and applications therewith.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Smart headphones generally comprise headphones having microphones and various auxiliary sensors supporting applications such as user authentication, heart rate monitoring, touch gesture control, voice communication, and so on. The auxiliary sensors (e.g., accelerometer, gyroscope) increase the weight, bulk, cost, and power consumption of smart headphones, which in turn hinder the adoption of such headphones by the consuming public. Further, the dependency on auxiliary sensors makes it hard to transfer the designs to commercial headphones that do not have the needed sensors.

SUMMARY

Various deficiencies in the prior art are addressed by systems, methods, architectures, mechanisms and apparatus providing a sensing platform wherein one or more headphone drivers are used as a versatile sensor to receive excitation signals therefrom indicative of direct or indirect pressures associated with the ear canal acoustically cooperating with the diaphragms operatively coupled to the drivers.

The various embodiments may be used to interpret received excitation signal(s) to identify therein voice information (voice detection), gesture information (gesture detection), unique human identification information (user identification), heart rate and/or breathing rate information (physiological monitoring) and so on. In this manner, new applications are provided within the context of mobile health, user interface, context-awareness, identification/authentication and the like.

Various embodiments may be implemented as a plug-in peripheral connecting the headphones and pairing device (e.g., a user device such as a smartphone or computer), or as an integrated circuit embedded into headphones or into a pairing device.

One embodiment comprises an apparatus for receiving information from a headset, the headset comprising a magnetic coil driver operatively coupled to a diaphragm, the magnetic coil driver configured to receive an audio input signal and responsively cause the diaphragm to generate air vibrations corresponding to the audio input signal, the apparatus comprising: a nulling circuit, configured for selective coupling to the magnetic coil driver, for nulling electrical energy associated with the audio input signal to provide thereby an output signal primarily comprising electrical energy associated with an excitation signal generated by the magnetic coil driver in response to external pressures imparted to the diaphragm; and an amplifier circuit, for amplifying the nulling circuit output signal to provide thereby an amplified excitation signal configured to enable determination of the external pressures imparted to the diaphragm.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 8A-8D graphically depict measured channel response for various touch gestures.

Figures 1A, 1B:
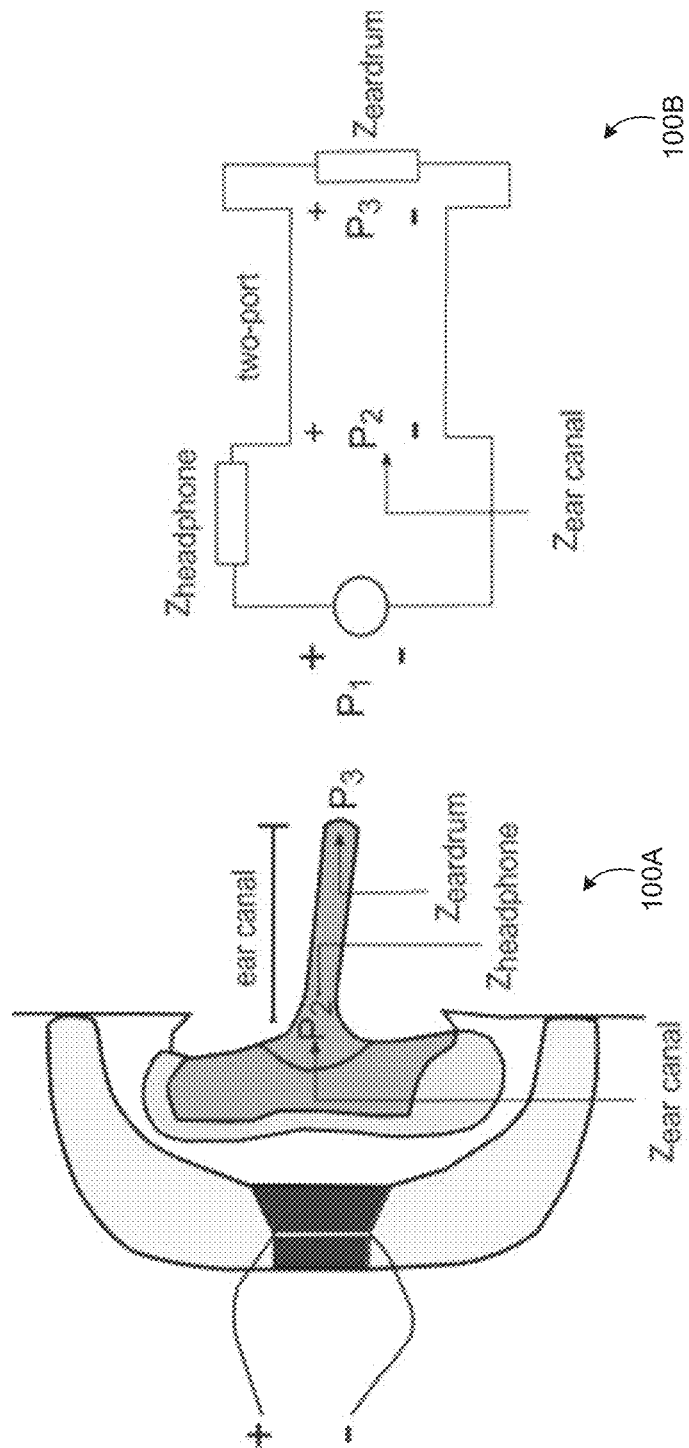
FIGS. 1A-1B graphically depict, respectfully, structural portions of a human ear and a two-port Thevenin equivalent network representation thereof.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide systems, apparatus and methods for implementing smart headphones in a cost effective manner, as well as a kit suitable for turning dumb headphones (audio output only) into smart headphones.

Advantageously, rather than using auxiliary sensors to implement smart headphone functions, the various embodiments utilize the existing speaker drivers associated with a pair of dumb headphones to enable smart headphone functions. Further, various embodiments may comprise a plug-in peripheral for connecting existing headphones to a pairing device (e.g., a user device such as a smartphone or computer) in a non-intrusive manner, thereby avoiding hardware modification or customization which might add weight/bulk, or require access to internal circuit design and external structure/integrity of dumb headphones. Further, the various implementations provide a relatively low cost peripheral that introduces minimal power consumption on both headphones and the pairing device.

All headphones turn electrical energy into sound by using magnet coils that drive the diaphragm to vibrate the air. The voltage measured at each driver is determined by three factors; namely, the electrical energy of an audio input signal received via wire, Bluetooth or other means (e.g., music to be played via the headphones), the equivalent impedance of the driver, and the air pressure at the corresponding diaphragm.

Part of the inventors' contribution is to recognize that the coupling effect between the headphones and the surroundings may be leveraged to enable new functionalities. For example, when a user wears a pair of headphones, the headphones, ear canal, and eardrum are coupled together to form a semi-hermetic space that is extremely sensitive to pressure changes. A pressure change can be induced externally by a vibration of the headphone caused by external sounds and/or vibrations, even something as gentle as touching the headphones. Similarly, internal physiological activities of a headphone wearer such as heart beats cause repetitive deformation of blood vessels in the ear canal, which in turn alter the pressure inside the semi-hermetic space. Given that humans have ear canals of relatively unique sizes and shapes, this uniqueness gives rise to a new modality for human identification and such modality is implemented in several embodiments.

Thus, as a voltage associated with the speaker drivers of the headphones is affected by pressure changes within the human ear canal, this voltage variation may be used to detect not just external changes (e.g., sounds, touches, etc.) but also subtle internal physiological changes (e.g., heartbeats, etc.). In this manner, various embodiments also find utility within the context of mobile health, user-interfaces, user authentication, context-awareness and so on.

FIGS. 1A-1B graphically depict, respectfully, structural portions of a human ear and a two-port Thevenin equivalent network representation thereof.

When a user puts on her headphones, the headphones will cover the semi-closed inner ear of the user, as shown in FIG. 1A, where the headphones, the ear canal, and eardrum are couple together (acoustically cooperating) and establish thereby a pressure field that can be modeled by the two-port Thevenin equivalent network shown in FIG. 1B. The variables in the two-port Thevenin equivalent network are defined as follows:

$P_{headphones}$: Thevenin pressure of headphones.
$Z_{headphones}$: Equivalent impedance of headphones.
$P_{eardrum}$: Thevenin pressure of eardrum.
$Z_{eardrum}$: Equivalent impedance of eardrum
$P_{earcanal}$: Thevenin pressure of ear canal.
$Z_{earcanal}$: Equivalent impedance of ear canal.

The relationship between the impedance $Z_X$ and the pressure $P_X$ in this model can be represented by the following equation:

$$\frac{P_{earcanal}}{P_{headphones}} = \frac{Z_{earcanal}}{Z_{earcanal} + Z_{headphones}} \quad (eq.\ 1)$$

From the above equation, it can be seen that $Z_{headphones}$ varies with the Thevenin pressures $P_{headphones}$, $P_{earcanal}$, and also the impedance $Z_{earcanal}$, all of which are affected by human-induced excitation signals. For example, when the user touches the enclosure of her headphones, this touch gesture drives the enclosure to vibrate and thus affects the value of the Thevenin pressure $P_{headphones}$. Similarly, physiological activities such as breathing and heart beat cause repetitive deformation of blood vessels in the ear canal and thus alter the Thevenin pressure $P_{earcanal}$. Also, since the size and shape of the ear canal varies among each individual, the impedance of the ear canal $Z_{earcanal}$ differs among individuals as well. Therefore, since the electrical signal at the headphone driver ($E_{headphones}$) is effected by $Z_{headphones}$, the various embodiments utilize $E_{headphones}$ to sense these human-headphones interactions and physiological activities.

Figure 2A:
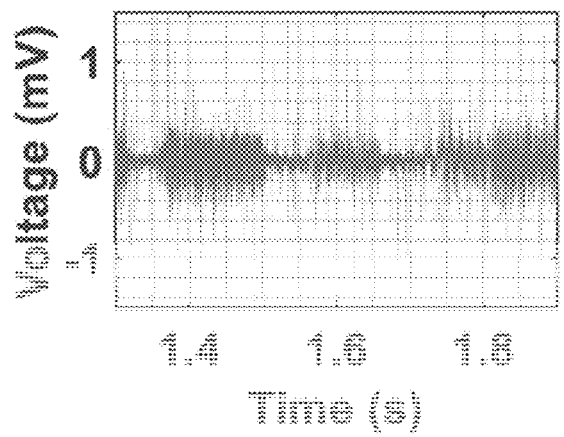
FIGS. 2A-2C graphically depict illustrative time domain excitation signals for, respectfully, voice, gesture, and music.
Figure 2B:
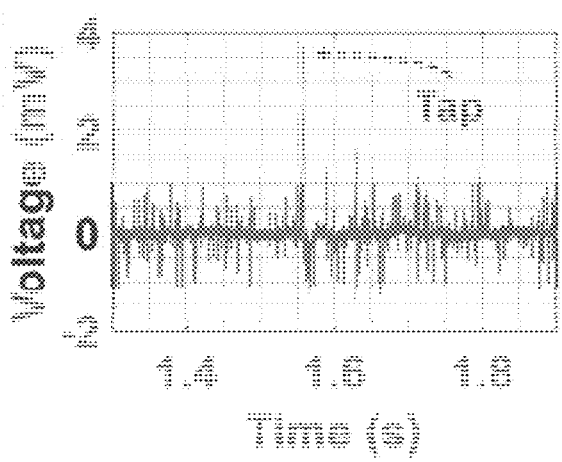
Figure 2C:
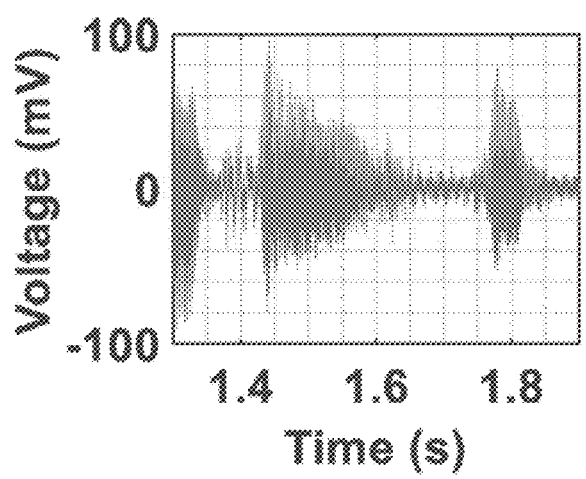

FIGS. 2A-2C graphically depict illustrative time domain excitation signals for, respectfully, voice, gesture, and music. Specifically, FIG. 2 graphically depicts representative headphone driver voltage $E_{headphones}$ signals caused by different excitation signals; namely, a user talking such that the user's voice is received at the diaphragm of the headphones (FIG. 2A), a user tapping the headphone enclosure with her finger (FIG. 2B), and music being played through the headphones (FIG. 2C). It can be seen by inspection that the input music signal is on the order of hundred millivolts, while the voltage variation caused by a user's speech is normally less than one millivolt, and the voltage variation caused by a user tapping on the headphone is less than 5 millivolts.

To achieve sufficient measurement sensitivity and discrimination for speech (user voice), tapping (user gestures), and physiological sensing (user heartbeat or breathing), the various embodiments utilize a passive null circuit to substantially reduce or eliminate the voltage variation attributable to an input music (audio) signal.

Figure 3:
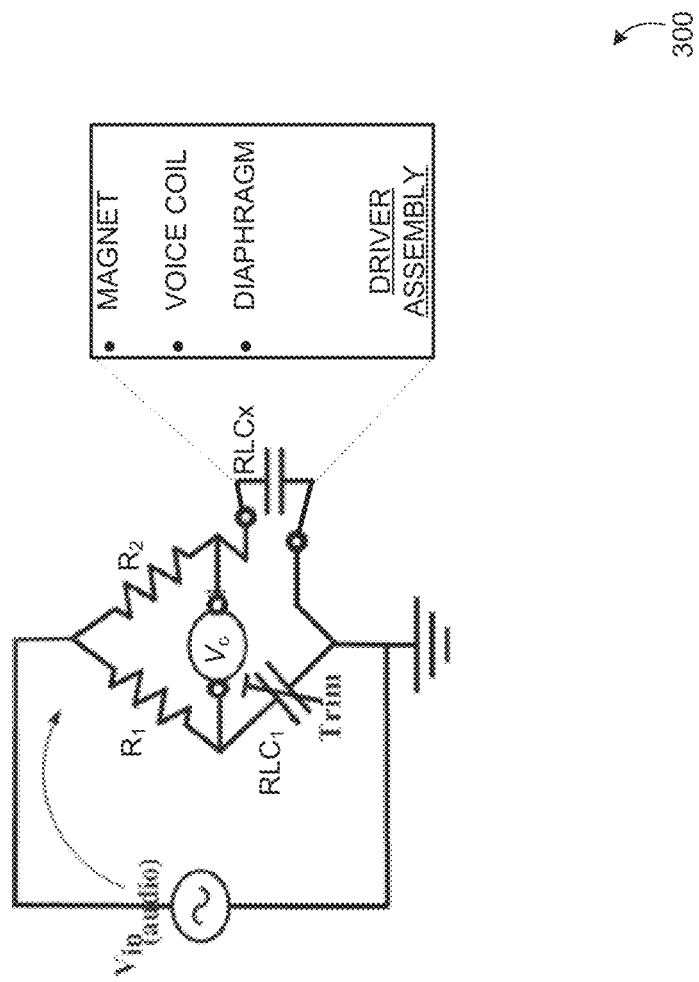
FIG. 3 depicts a schematic representation of an exemplary nulling circuit suitable for use in various embodiments.

FIG. 3 depicts a schematic representation of an exemplary nulling circuit suitable for use in various embodiments. Specifically, the nulling circuit 300 of FIG. 3 comprises, illustratively, a Wheatstone bridge which is configured to detect minute variations of headphone driver voltage $E_{headphones}$ caused by excitation signals.

Generally speaking, a nulling circuit such as a Wheatstone Bridge determines a difference between a signal and a reference entirely with resistors at a low noise given the sensor resistance and the temperature (e.g., compared to active circuits using operational amplifiers and the like). The Wheatstone bridge is well suited to measuring small excitation signals and automatically eliminates the more significant audio signal present at no extra cost (interference cancellation).

The nulling circuit 300 of FIG. 3 comprises a Wheatstone bridge having two voltage divider arms coupled across a voltage source Vin, where Vin represents an audio signal. Specifically, a first of the voltage divider arms comprises a resistor R1 and an adjustable impedance device $RLC_1$ (e.g., an adjustable capacitor) connected in series in the order named, a second of the voltage divider arms comprises a resistor R2 (substantially identical to R1) and a headphone driver of unknown impedance $RLC_X$ connected in series in the order named. The impedance or reactance of the adjustable impedance device $RLC_1$ and headphone driver $RLC_X$ comprise one or more of resistive (R), inductive (L) and/or capacitive (C) components.

The adjustable impedance device $RLC_1$ is adjusted until its impedance equals that of headphone driver $RLC_X$, such that (given that R1=R2) a "balanced" impedance bridge is achieved. In such a balanced state, the voltages on the two loads (two voltage divider arms) are the same, resulting in a voltage output $V_O$ of zero (measured between the non-common ends of resistors R1 and R2). Any minute change in the impedance of headphone driver $RLC_X$ (the headphone driver) alters the voltage on this load an unbalances the bridge, leading to a non-zero output voltage $V_O$.

In operation, the nulling circuit 300 of FIG. 3 receives an input voltage Vin comprising an audio signal which is balanced (nulled or substantially eliminated) via the Wheatstone bridge circuit or other nulling circuit configuration. The headphone driver $RLC_X$ forming part of the second voltage divider arm is part of a driver assembly comprising a magnet, voice coil and diaphragm operably connected in a standard manner to convert electrical signals into audible signals/sounds. Specifically, the driver (magnet and voice coil) operates to drive the corresponding diaphragm to generate air vibrations corresponding to the audio input signal, thereby creating sound for the wearer of the headphones from the speaker including that diaphragm. However, the voltage output $V_O$ of the nulling circuit remains at or substantially near to zero volts since the audio signal also powers both voltage divider arms, thereby nulling the voltage output $V_O$.

Given that the audio signal is nulled (substantially zeroed or removed), any remaining electrical signal is due to electrical energy associated with an excitation signal generated by the magnetic coil driver in response to external pressures imparted to the diaphragm. That is, the null circuit is configured for selective coupling to the magnetic coil driver for nulling electrical energy associated with the audio input signal to provide thereby an output signal primarily comprising electrical energy associated with an excitation signal generated by the magnetic coil driver in response to external pressures imparted to the diaphragm. The output of the null circuit may be amplified as needed to provide an amplified excitation signal which may be processed to determine the temporal and/or spectral content of the excitation energy and, therefore, determine the external pressures imparted to the diaphragm necessary to cause such excitation energy.

The single-speaker embodiment discussed above requires precise impedance matching of impedance device $RLC_1$ and headphone driver $RLC_X$ to function properly. Given the precise manufacturing standards used to produce driver circuitry such as magnetic coils and the like, it is possible to perform this impedance matching in a manufacturable and scalable manner.

In various embodiments, the tight manufacturing standards of such components for headphones are used to provide an embodiment that does not need any adjustment. That is, rather than matching impedance device $RLC_1$ to headphone driver $RLC_X$, a two-speaker embodiment will now be discussed in which each of the impedance device $RLC_1$ and headphone driver $RLC_X$ conforms to one of the left and right magnetic coil drivers used within a standard headphone.

Figure 4:
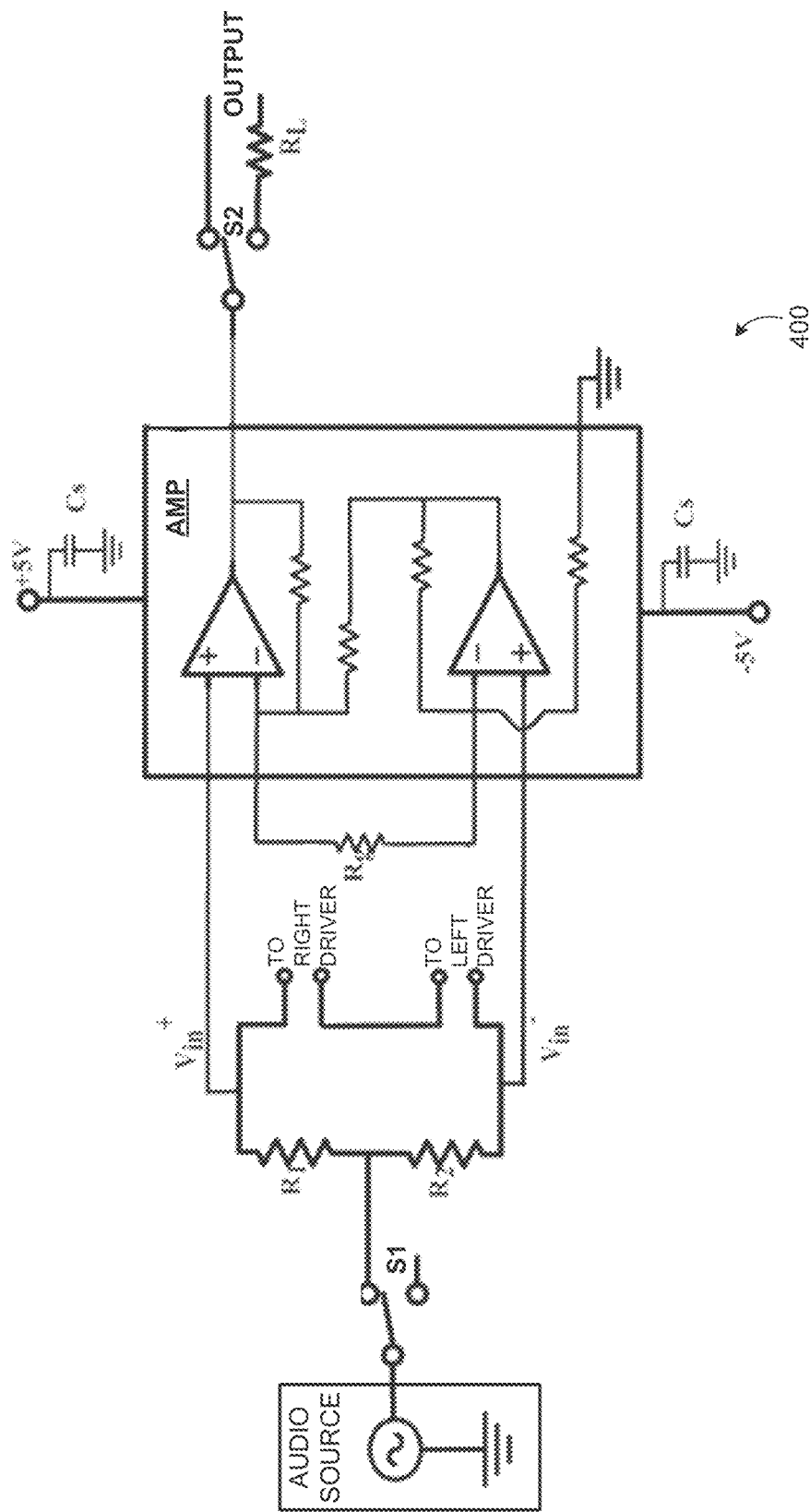
FIG. 4 depicts a schematic representation of an apparatus according to an embodiment.

FIG. 4 depicts a schematic representation of an apparatus according to an embodiment. Specifically, FIG. 4 depicts an excitation signal detector 400 coupled to an audio source (e.g., an audio output of a user device via a 3.5 mm plug, universal serial bus (USB), micro USB (uUSB), USB-C, Lightning or other connector), a set of headphones (e.g., wired headphones with a via a 3.5 mm plug, USB, uUSB, USB-C, Lightning or other connector), and an audio receiver (e.g., an audio input of a user device via a 3.5 mm plug, USB, uUSB, USB-C, Lightning or other connector).

An audio input signal is coupled to a nulling circuit (e.g., a Wheatstone bridge such as described above with respect to FIG. 3) via an optional bypass switch S1. The two voltage divider arms comprise (1) the series components of R1 and the right speaker driver of the headphones, and (2) R2 and the left speaker driver of the headphones. Assuming standard 50 Ohm audio impedance matching, resistors R1 and R2 are each 50 Ohm resistors, though other values may be used as long as R1 is substantially equal to R2. More generally, R1 and R2 are selected to ensure that each of the voltage divider arms represents a substantially similar impedance (i.e., RLC impedance).

The null circuit nulls the audio input signal such that the differential voltage $V_{in}+$ and $V_{in}-$ (between the junction of R1/right driver and the junction of R2/left driver) representing electrical energy associated with an excitation signal generated by the magnetic coil drivers (right and left) in response to external pressures imparted to the diaphragms (right and left) is produced. The differential voltage $V_{in}+$ and $V_{in}-$ is coupled to a precision amplifier AMP, such as a 1NA126 instrumentation amplifier, which responsively produces an output voltage signal primarily representative of excitation signal energy, which signal coupled via a second optional bypass switch S2 as an output signal OUTPUT.

A 5000 Ohm output resistor $R_L$ may be used for triggering microphone detection circuitry of an audio input device, such as a smartphone or other user device. Other values of resistor $R_L$ may be used, depending upon the requirements of the various microphone detection circuits (e.g., 4.7 kΩ etc.).

The output signal OUTPUT may be provided to an audio receiver for further processing (e.g., to an audio input of a user device via a 3.5 mm plug, USB, uUSB, USB-C, Lightning or other connector, for processing using an application thereon or for digitization/transmission to a remote processing device).

In various embodiments, the amplifier circuit AMP is not used and the differential voltage $V_{in}+$ and $V_{in}-$ is presented as the output signal OUTPUT.

It is noted that the left and right headphone drivers are typically wired to be in-phase for coherent stereo playback (AC signal). The voltages measured at the left driver $E_{left}$ and the right driver $E_{right}$ as received at the null circuit are phase inverted with respect to each other such that the voltage output $V_g$ of the bridge characterizes the difference of $E_{left}-E_{right}$ (i.e., $V_g=E_{left}-E_{right}$). In practice, the excitation signals arrive at each driver via unequal paths such that a slight differential voltage exists with respect to each of the left and right excitation signals $E_{left}$ and $E_{right}$.

In various embodiments, the apparatus discussed above comprises a stand-alone device comprising an enclosure (not shown) configured for mechanically supporting the nulling circuit and amplifier circuit, the enclosure having disposed thereon a first headphone connector configured to provide electromechanical cooperation between the apparatus and a headphone device, and a second headphone connector configured to provide electromechanical cooperation between the apparatus and an audio device. The first and second headphone connectors may comprise any of a 3.5 mm plug, a universal serial bus (USB) connector, a uUSB connector, a USB-C connector, and a Lightning connector. In such embodiments, any necessary power (e.g., +5V, −5V for the exemplary amplifier) may be derived from a battery within the enclosure (nor shown) or power received from the audio device into which the apparatus is connected. In some embodiments, additional power conditioning circuitry may be needed such as to derive a −5V signal via a provided +5V signal.

In various embodiments, the apparatus discussed above with respect to FIG. 4 comprises a device or module (e.g., additional or modified integrated circuit) within a user device such as a smart phone, laptop or other computing device. In such embodiments, any necessary power may be derived from user device within which the apparatus is implemented.

Figure 5:
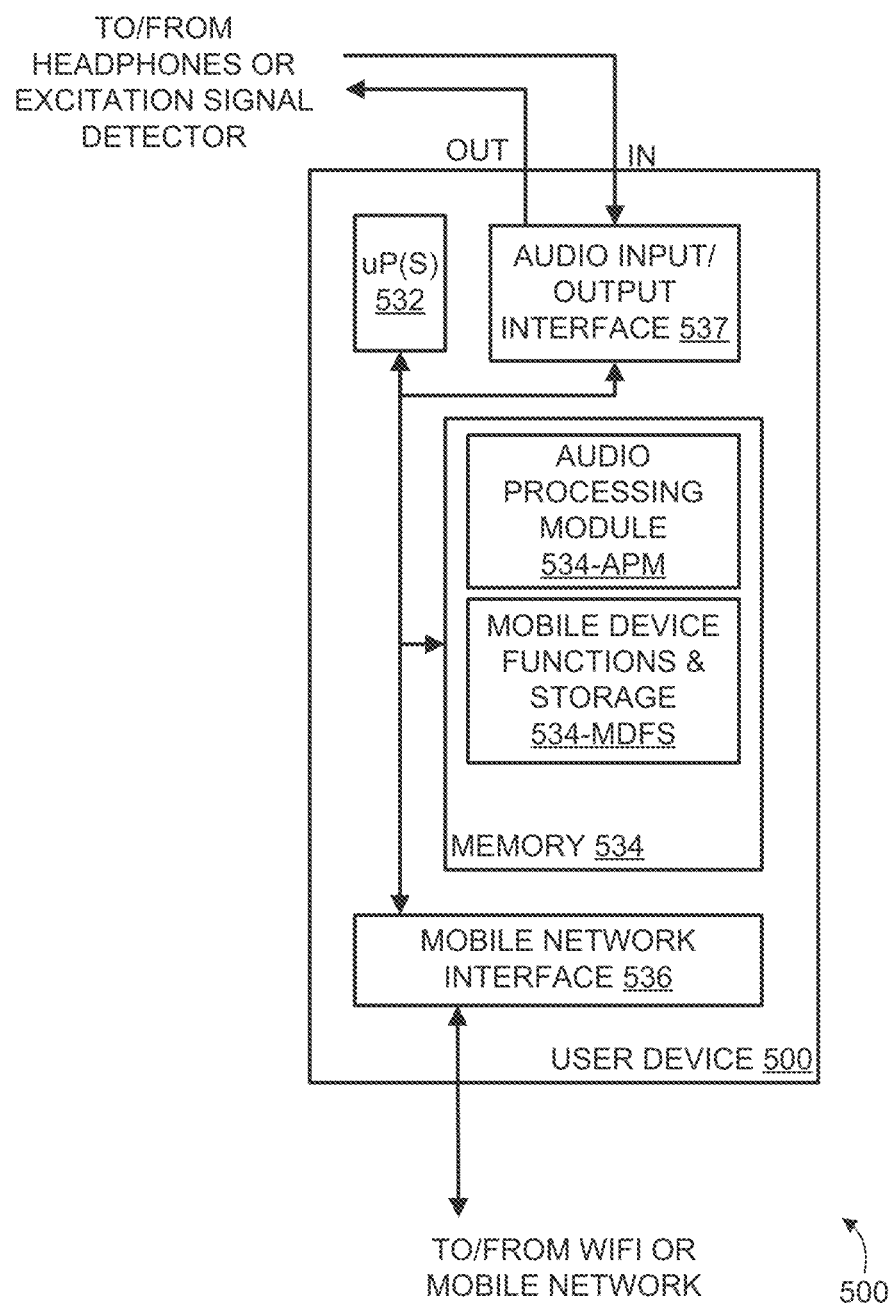
FIG. 5 depicts a high level block diagram of a user device suitable for use with the various embodiments.

FIG. 5 depicts a high level block diagram of a user device suitable for use with the various embodiments. Specifically, FIG. 5 depicts an exemplary user device 500 (e.g., a mobile phone, smartphone laptop or other device (or portion thereof) having audio processing capability). The user device 500 is depicted as including one or more processor(s) 532, a memory 534, a mobile network interface 536, and an audio input/output interface 537. The processor(s) 132 is coupled to, and adapted to cooperate with, the memory 134, the mobile network interface 536, the audio input/output interface 537, and various other support circuitry (not shown) to provide the various functions as described herein with respect to the excitation signal/audio processing functions described herein with respect to the various embodiments.

The mobile network interface 536 is depicted as facilitating communications with other devices via Wi-Fi, mobile networks and the like.

The audio input/output interface 537 is depicted as facilitating audio input/out to headphones such as via a 3.5 mm plug, USB, uUSB, USB-C, Lightning or other connector.

In various embodiments the audio input/output interface 537 provides wireless communications to headphones such as via Bluetooth or other radio frequency (RF) communications schemes.

In various embodiments, the audio input/output interface 537 may generate an output signal suitable for use as the input audio signal to be processed by the excitation signal detector 400 of FIG. 4.

In various embodiments, the audio input/output interface 537 may receive for processing the excitation voltage related output audio signal generated by the excitation signal detector 400 of FIG. 4. In various embodiments, the audio input/output interface 537 may perform analog to digital conversion of a received audio signal to provide a digital representation of the received audio signal suitable for further processing by the user device 500 or a remote device (not shown) such as a remote server or audio processor.

The memory 134, generally speaking, stores programs, data, tools and the like that are adapted for use in providing various functions as described herein with respect to the figures. For example, the memory 134 is depicted as storing instructions associated with a mobile device functions and storage module 534-MDFS. This module is directed to performing all of the various communications, display, input/output, application execution and other functions normally associated with a user device such as a mobile device, smart phone, laptop computer, desktop computer and the like.

The memory 134 is also depicted as storing instructions associated with an audio processing module 534-APM. This module is directed to performing various audio processing functions, digital signal processing (DSP) functions and the like as described herein with respect to the various embodiments. These functions may be implemented using the memory 534 and processor(s) 532, and optionally using capabilities associated with the audio I/O interface 537. Thus, the various functions described herein may be implemented in hardware or a combination of hardware and software.

The various functions that may be implemented be the embodiments include one or more of interpreting received excitation signal(s) to identify therein voice information (voice detection), gesture information (gesture detection), unique human identification information (user identification), heart rate and/or breathing rate information (physiological monitoring) and so on. Other functions are also contemplated by the inventors.

Figure 6:
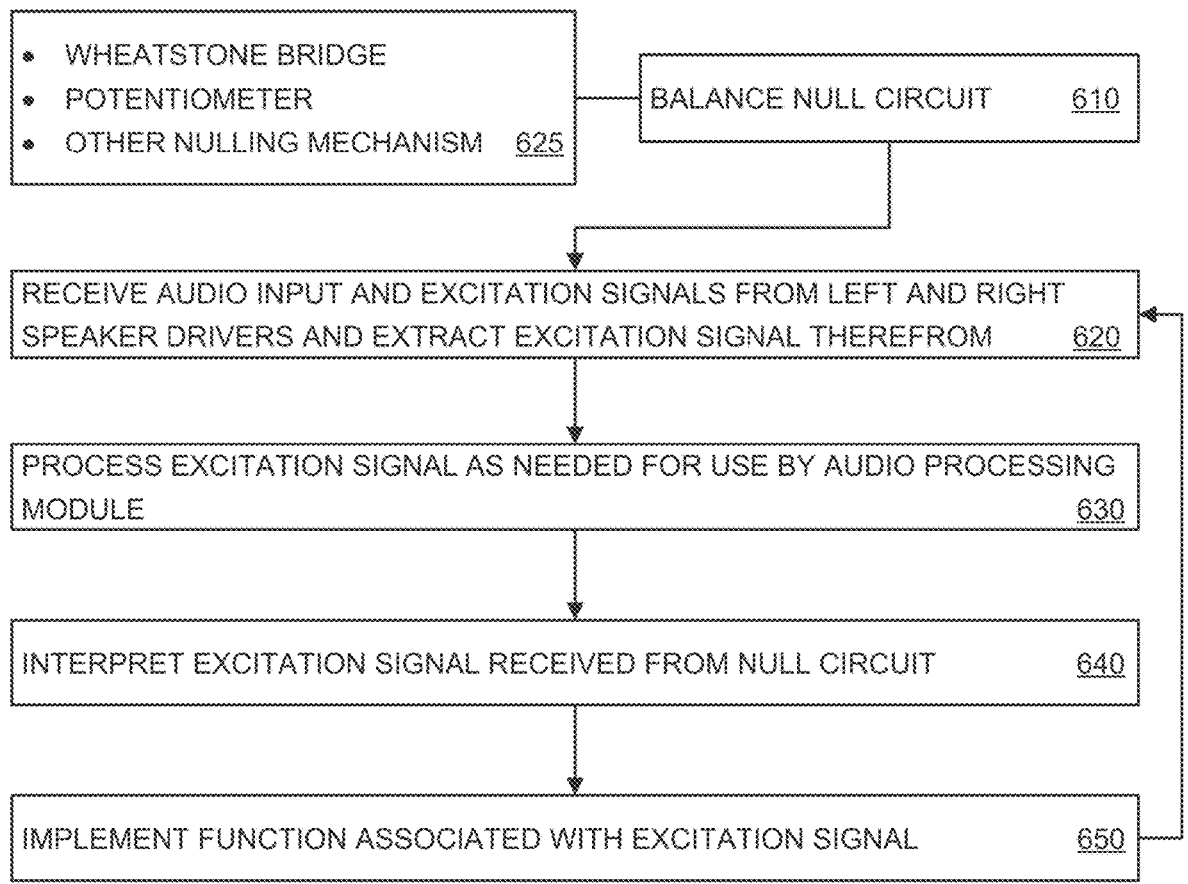
FIG. 6 depicts a flow diagram of a method according to various embodiments.

FIG. 6 depicts a flow diagram of a method according to various embodiments. The method 600 of FIG. 6 is suitable for implementation in whole or in part at an audio receiver in accordance with the various embodiments, such as a user device (e.g., smartphone, laptop or other device). For example, in the case of an audio receiver implementing the null circuitry and (optionally) amplification circuitry discussed above with respect to the various figures, the entirety of the method 600 may be performed at the audio receiver such as when connected to standard "dumb" headphones, or connected to headphones having more features. In the case of an audio receiver not implementing such null circuitry, at least step 610 may be implemented by apparatus external to the audio receiver, such as apparatus connected between the audio receiver and the headphones (e.g., the apparatus 400 discussed above with respect to FIG. 4).

At step 610, a null circuit is balanced. as previously discussed, search no circuit to balancing may be achieved by using both left and right driver impedances in respective arms of a nulling circuit, referring to box 615, The nulling circuit may comprise a Wheatstone bridge, a potentiometer or some other nulling mechanism.

At step 620, any available audio input and excitation signals are received from the left and right speaker drivers and an excitation signal is extracted therefrom. For example, at step 620 the voltage associated with the left and right speaker drivers may received by the balanced nulling circuit such that an excitation signal $V_O$ is provided thereby for use by an audio processing device directly (unamplified) or in an amplified form such as provided by the excitation signal detector 400 described above with respect to FIG. 4.

At step 630, the excitation signal is processed as needed for use by an audio processing module. For example, the excitation signal $V_O$ provided by the nulling device (or amplified output signal provided by the excitation signal detector 400) may be coupled to the user device 500 where the audio I/O interface 537, audio processing module 534-APM or other module may perform amplification, attenuation, analog to digital conversion and/or other signal conditioning functions on the excitation signal $V_O$ prior to specific interpretation/action functions performed in response to the excitation signal $V_O$.

At step 640, the excitation signal (processed or not) is interpreted to identify the information provided thereby, such as voice information (voice detection), gesture information (gesture detection), unique human identification information (user identification), heart rate and/or breathing rate information (user physiological information) and so on. For example, the audio I/O interface 537, audio processing module 534-APM or similar function of the user device 500 or other audio processing module/device may perform various DSP processing functions, computing functions, data manipulation functions and the like such as described herein to interpret and otherwise act upon the information provided by the excitation signal. Such functions may be part of or associated with other functions/applications being executed by the user device 500 or other audio processing module/device, such as communications apps, health monitoring apps, authentication apps and the like.

At step 650, the function associated with the interpreted excitation signal is implemented. For example, received voice information may be provided to an active communications application to support a phone call, provided to a user interface as part of a voice recognition command and the like. Received gesture information may be used to update the context of a user interface or invoke a application control function (e.g., two taps on the right speaker indicating a 30 second skip forward in an audio presentation, two taps on the left speaker indicating a 30 second skip backward in an audio presentation and so on). Received human identification information may be used to authenticate a user to access particular programs or even use particular equipment (e.g., the headphones themselves, the user device, etc.). Received physiological information may be used to update a health monitoring program. Many other uses are envisioned by the inventors.

Steps 620-650 are repeated to continually receive any available excitation signals from the null circuit.

Discussion of Direct and Indirect Sensitivity

A first category of applications relies on the measurement of a direct excitation signal received via the headphone diaphragm, such as the signals generated directly from human voice, touch-based gestures, and physiological activities for sensing. Experiments show that the received signal strength (RSS) measurements of a direct excitation signal, even in the presence of an output audio signal, is more than sufficient to support such applications.

A second category of applications relies on the measurement of an excitation signal received via the headphone diaphragm in response to a generated output signal (e.g., a chirp signal exhibiting frequency components spanning 20 Hz to 20 KHz for a brief amount of time, such as one second), such as for human authentication where the reflection signal associated with the generated signal is used to profile the structure of the inner ear of the person to be authenticated. Experiments show that the received signal strength (RSS) measurements of an indirect excitation signal, even in the presence of an output audio signal, is more than sufficient to support such applications.

Headphones ON-OFF Detection and User Authentication Functions

Various embodiments provide an authentication function that is non-intrusive and, optionally, triggered automatically when the user puts on the headphones. Such functions are implemented via the processing steps as described herein using, illustratively, the audio I/O interface 537, audio processing module 534-APM or similar function of the user device 500 or other audio processing module/device.

A headphones ON-OFF detection may be implemented by processing received excitation signals to determine if the ambient acoustic noise will is indicative of a resonant noise within a cavity (i.e., the cavity of the user's ear canal and eardrum together establishing resonance chamber), which cavity amplifies the ambient acoustic noises. This amplified noise leads to a higher voltage signal output which, when exceeding a threshold level, may be interpreted as an indication that the headphones have been put on by the user.

Since plugged headphones typically work in a quasi-full-duplex manner, they can be used to proactively probe the ear channel response. Specifically, in one embodiment the user device (e.g., a smartphone) sends an audio chirp signal (e.g., a short or burst" signal exhibiting frequency components spanning 20 Hz to 20 KHz for a brief amount of time, such as one second) through the headphones for propagation into the inner ear structure of the user, whereupon the two drivers of the headphones receive an echo signal that may be used to characterize the channel response of the ear canal.

Figure 7A:
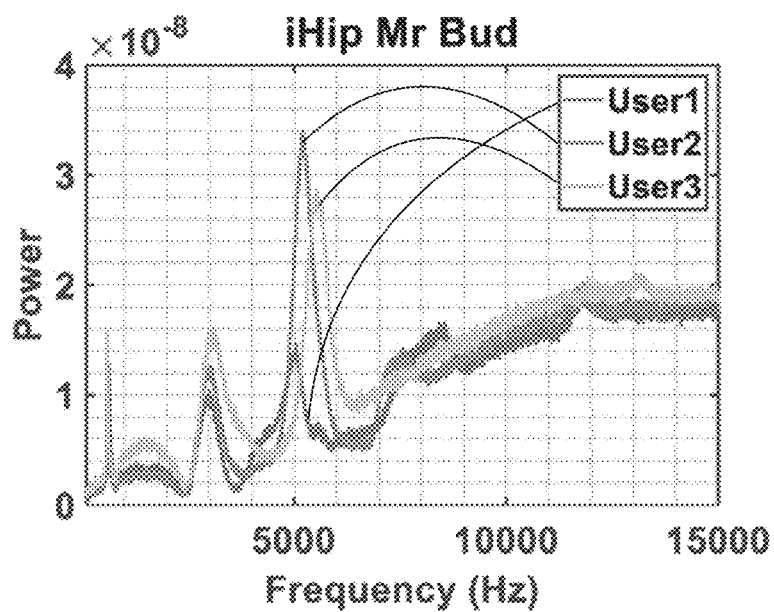
FIGS. 7A-7B graphically depict measured channel response for three different people in response to an audio chirp signal.
Figure 7B:
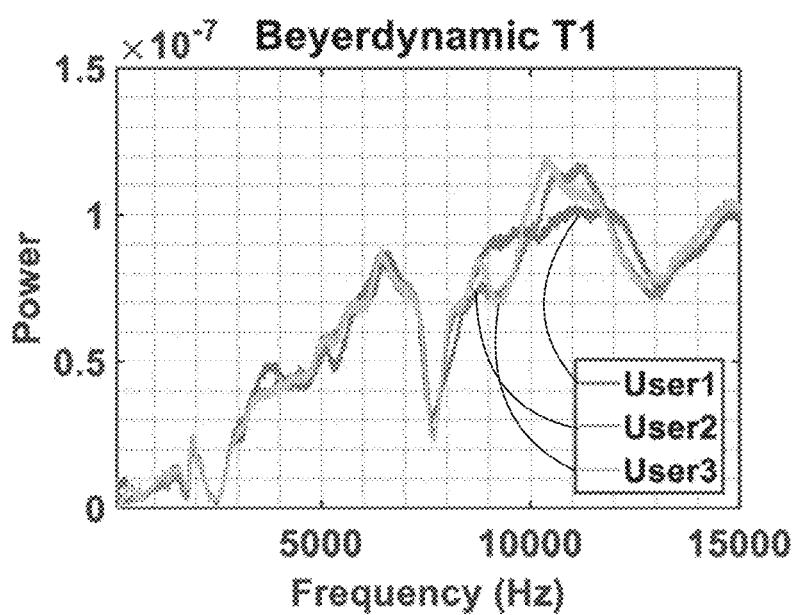

FIGS. 7A-7B graphically depict measured channel response for three different people in response to an audio chirp signal. It can be seen that the three channel responses are dramatically different in frequency band higher than 3 kHz. This is because the physiological differences between human ears are in the scale of sub-centimeter level, which can be picked up by signal with a wavelength of sub-centimeters ($\geq 3$ kHz). The characteristic channel responses of individuals may be used to identify such persons.

Since each ear is different (even left and right of the same person), the channel response from the left ear does not cancel out the channel response from the right ear. As such, the channel response measured may be used to characterize the user an a fairly unique manner. It is noted that channel response may differ depending upon the headphones used. As such, a standard headphone should be used to identify users or, alternatively, a scaling table may be used to normalize user channel response information across headphone brands and/or models.

Voice and Noise Sensing Functions

Various embodiments provide a voice/noise sensing function that may be invoked even while the user is listening to music on the headphones. Such functions are implemented via the processing steps as described herein using, illustratively, the audio I/O interface 537, audio processing module 534-APM or similar function of the user device 500 or other audio processing module/device.

In a voice sensing mode of operation, the user's voice is sensed and may be used for various purposes such as user authentication, application control, voice to text processing and the like. Further, in a related noise sensing mode of operation, excitation signals associated with the ambient noise of each of the left and right speakers/diaphragms may be used to detect ambient noise and, in response, cancel such noise via a substantially identical phase reversed signal of similar power/volume level as is known. That is, by discerning left/right headphone ambient similarities, the various embodiments enable detection and cancelling of common/ambient noise. Similarly, by discerning left/right headphone ambient differences, the various embodiments enable detection of poor headphone sealing on a user's ear (i.e., the ambient noise of each ear should be substantially similar in power or volume level if the headphones are properly fitted to each ear and provide similar amounts of noise isolation to each ear). That is, a difference in left and right side ambient noise levels above a threshold amount may be considered as indicative of an improper sealing of the side associated with the headphone driver exhibiting the larger ambient noise level.

Physiological Sensing Functions

Various embodiments provide a physiological sensing function that may be invoked even while the user is listening to music on the headphones. Such functions are implemented via the processing steps as described herein using, illustratively, the audio I/O interface 537, audio processing module 534-APM or similar function of the user device 500 or other audio processing module/device.

Detecting user heart rate is challenging due to the extremely weak excitation signal induced by the subtle blood vessel variation in the ear canal. The relevant signal can be below the noise floor and, since it is a weak signal, it can be easily interfered by the headphone user's other movements.

To solve these challenges, the various embodiments utilize (e.g., at the user device 500) a low pass filter with a very low cut-off frequency (e.g., 24 Hz) to remove the high frequency noise introduced by the echoes of audio input signals and environment excitation. Then, to find the periodicity indicative of a heartbeat or breathing an autocorrelation function (ACF) is uses, such as the following:

$$r_{xx}(k) = \frac{1}{N-k} \sum_{n=0}^{N-1-k} x(n)x(n+k). \quad \text{(eq. 2)}$$

where x(n) is a copy of the signals output from the excitation signal detector 400, k is the lag, and N is the length of the received signals. Blindly enumerating all choice of k in hopes of finding the peak is computationally intractable and may also introduce false positives. Thus, an upper (U) and lower (L) bound of k is set based on the possible heart rate of human beings (~35-200 bpm).

The goal can be represented by the following function:

$$k^* = \arg\max\, 1_{k \subseteq (L,U)} r_{xx}(k) \quad \text{(eq. 3)}$$

The heart rate can be calculated as $$R_{BPM} = 60 \cdot \frac{F_s}{k^*},$$

where $F_s$ is the sampling rate. Since body movements may also introduce strong excitation signals that can overwhelm the minute heartbeat signals, in various embodiments the voltage output level of the received excitation signal is truncated into several windows and the calculation $R_{BPM}$ is performed for each window. An outlier detection algorithm is then used to filter out outlier estimations and then an average of what remains is used to obtain the heartbeat rate.

In various embodiments, non-repetitive physiological conditions may be detected such as seizures (e.g. Parkinson's micro-seizures), thermal shivering (teeth chattering), jaw clenching (jaw gesture control/bruxism), blood pressure and the like. Further, ear infections that change the inner ear geometry (e.g., due to pressures deforming the ear drum) may be determined as deviations with respect to a known profile of a user's ear canal/structure.

Touch-Based Gesture Recognition Functions

Various embodiments provide a touch-based gesture recognition function that may be invoked even while the user is listening to music on the headphones. Such functions are implemented via the processing steps as described herein using, illustratively, the audio I/O interface 537, audio processing module 534-APM or similar function of the user device 500 or other audio processing module/device. It is noted that these embodiments advantageously enable "dumb" headphones to operate as "smart" headphones as discussed herein.

Specifically, variations in the excitation output voltage caused by different gestures manifests unique features in both spatial and temporal domains. Without loss of generality, four touch-based gestures are defined; namely, i) tapping the left enclosure to indicate pause or play; ii) tapping the right enclosure to indicate mute; iii) sliding on the left enclosure to indicate volume up; and iv) sliding on the right enclosure indicate volume down. It is noted that the gestures that may be supported are not limited to these four gestures. Various embodiments to analyze/interpret the temporal features of the excitation output voltage signals for gesture recognition.

FIGS. 8A-8D graphically depict measured channel response (RSS as a function of time) for various touch gestures.

FIG. 8A shows an example where the user taps the left enclosure of headphones, while FIG. 8B shows an example where the user taps the right enclosure of headphones. It can be seen that when there is a tap on the headphone, multiple peaks are observed, and that the first large peak is a positive peak for a right tap (FIG. 8A) and a negative peak for a left tap (FIG. 8B). The RSS value here can be positive or negative depending on the direction of the signal. There is an increasing signal strength when the user taps the left enclosure of headphones, and a decreasing signal strength when the user taps her right enclosure. This is because the Wheatstone bridge measures the differential voltage between the two drivers of the headphones. Thus, the excitation signals measured at the bridge are phase inverted for right tap and left tap gestures. That is, the excitation signals captured by the left driver and the right driver are phase inverted when received by the nulling circuit (bridge). It is noted that a music signal is orders of magnitude lower and, therefore, would not cause interference with the large peaks introduced by tapping signals.

FIG. 8C shows an example where the user slides or swipes a finger across the left enclosure of headphones, while FIG. 8D shows an example where the user the user slides or swipes a finger across the right enclosure of headphones. As with left and right tapping gestures, left and right sliding gestures can also be easily distinguished from the first large peak and there is an inverse trend on the strength variation. However, sliding gestures usually last longer than tapping gestures in the time domain. Therefore, signal duration is used to distinguish between tapping and sliding gestures.

In various embodiments, a cumulative sum (CUSUM) signal processing function is used to capture the relevant temporal features for gesture recognition. Specifically, denoting the output voltage samples by $X_n$, the CUSUM functions associates each signal sample with a weight $\omega_n$ and then computes a value $S_n$ with the following equations:

$$S_0 = 0 \quad \text{(eq. 4A)}$$

$$S_{n+1} = \max(0, S_n + x_n - \omega_n) \quad \text{(eq. 4B)}$$

This simple function enables removal of the negative peaks while keeping the large positive peaks. To remove the positive peaks while keeping the large negative peaks, the term max is replaced with the term min. The output voltage samples may be processed using the two CUSUM functions (max and min) in parallel. It is noted that the impact of ambient music signals is removed after applying CUSUM functions.

The method then determines left sliding/tapping or right sliding/tapping by applying the following rule:

$$\begin{cases} t_1 \geq t_2 & \text{left} \\ t_1 < t_2 & \text{right} \end{cases} \quad \text{(eq. 5)}$$

where $t_1$ and $t_2$ are the starting time points of the first positive peak and first negative peak, respectively.

The method defines the duration of a gesture as the mean time between the first and the last non-zero CUSUM value. To distinguish tapping and sliding gestures, the method may measure the duration of them among different individuals, and empirically set a threshold of, illustratively, 5000 samples (sampling rate of 48 kHz).

Thus, the various embodiments provide a system, apparatus, method and mechanism by which user information sensed by the headphones may be provided to a user device or system, such as a smartphone or other device having audio processing capabilities.

In an authentication interpretation mode of operation, a user device or system may cause an audio chirp signal to be propagated to the headphones to induce thereby an excitation signal indicative of an inner ear structure of a headphone wearer. Further, ear infections and other conditions that change the inner ear geometry (e.g., due to pressures deforming the ear drum) may be determined as deviations with respect to a known profile of a user's ear canal/structure.

In a gesture interpretation mode of operation the user device or system may monitor an excitation signal to derive therefrom user gesture input suitable for use in adapting a function of the user device.

In a voice interpretation mode of operation the user device or system may monitor an excitation signal to derive therefrom user voice input suitable for use in adapting a function of the user device. Further, noise cancelling and headphone sealing detection may be determined with respect to ambient noise received via both left and right headphones by noting left/right similarities (enabling detection and cancelling of common/ambient noise) and differences (enable detection of power/volume differences of common/ambient noise; louder noise likely due to poor headphone sealing on user's ear).

In a physiological interpretation mode of operation the user device or system may monitor an excitation signal to derive therefrom repetitive physiological information of the headphone user (e.g., heartbeat and/or breathing) suitable for use in adapting a function of the user device. In various embodiments, non-repetitive physiological conditions may be detected such as seizures (e.g. Parkinson's micro-seizures), thermal shivering (teeth chattering), jaw clenching (jaw gesture control/bruxism), blood pressure and the like. Further, as noted above, ear infections that change the inner ear geometry (e.g., due to pressures deforming the ear drum) may be determined as deviations with respect to a known profile of a user's ear canal/structure.

The above-described embodiments are primarily directed to embodiments operative to convert left and/or right audio output signals into a non-stereo (i.e., mono) audio signal for sensing or extracting an excitation signal therefrom. This mono audio conversion may affect user experience in some but not all applications. A voice calling application is not typically a stereo application, so there is no appreciable effect on the user experience by the various embodiments. A music playing application is typically a stereo application, so the user experience may be compromised by the various embodiments. A user identification application is a short duration application, so any compromise to the user experiences is limited to the occasional short duration time period. duration. A physiological sensing application such as heartrate monitoring typically requires continuous sensing, so a compromise to the user experience is possible (various embodiments utilize a switch to enable a user to turn off the apparatus).

The above embodiments may be used for stereo processing such as by using a separate matching network to independently balance the left and right drivers rather than balancing them as a single pair. In this manner a user may retain the stereo experience.

Additional embodiments will now be described with respect to a stereo audio application such as a music playing application invoked at a user device, such as depicted above with respect to FIG. 5 (e.g., a mobile phone, computer, or other audio source/player).

The user device 500 of FIG. 5 as described above may be configured to generate left and right speaker driver signals from a stereo audio source (e.g., stored or streaming audio files, stored or streaming media files, and/or other types of content with audio information), which are then provided to user headphones via a wired or wireless connection.

The headphones as described above include left and right headphone speaker drivers operable to drive corresponding left and right speaker diaphragms configured to responsively generate sound pressure to thereby enable a user of headphones to listen to the music or other audio signal. The speaker drivers are also used as versatile sensors to receive excitation signals from the left and right speaker diaphragms indicative of direct or indirect pressures applied to the speaker diaphragms due to the ear canals of the user acoustically cooperating with the speaker diaphragms operatively coupled to the drivers.

The user headphones as described above also include circuitry configured to support the various functions described herein with respect to the embodiments.

Figure 9:
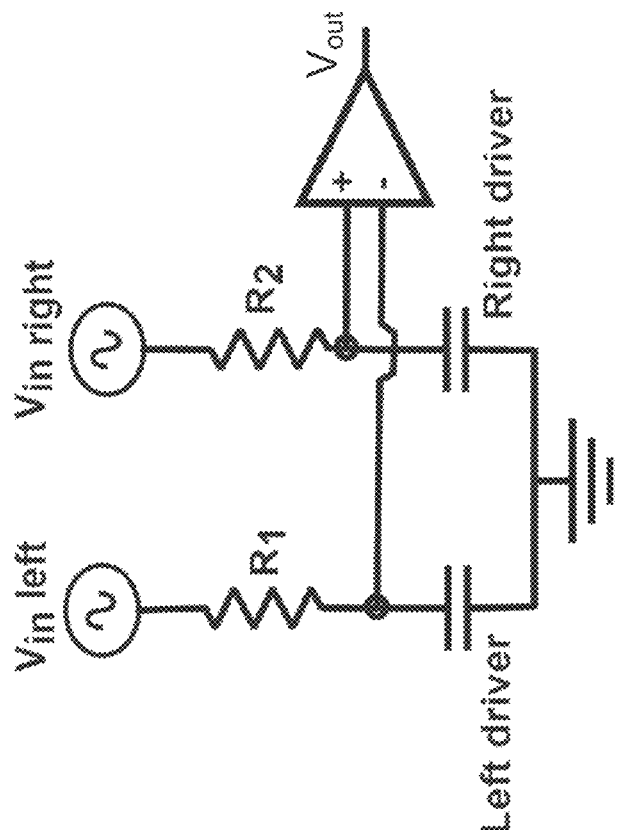
FIG. 9 depicts a schematic representation of an apparatus according to an embodiment.

FIG. 9 depicts a schematic representation of an apparatus according to an embodiment. Specifically, FIG. 9 depicts an excitation signal detector 900 coupled to receive audio signals from a stereo audio source (e.g., stereo audio output signals of a user device 500 of FIG. 5 such as via a 3.5 mm plug, universal serial bus (USB), uUSB, USB-C, Lightning or other connector), wherein the received audio signals are used to drive respective left and right headphone speakers so as to present audio signal to a user via left and right headphone speakers while also acquiring excitation energy from the respective left and right headphone speakers, the acquired excitation energy is being retrieved via a differencing or differential amplifier circuit and provided as an output signal Out suitable for further processing as discussed herein.

Referring to FIG. 9, left ($V_{in}$left) and right ($V_{in}$right) audio input signals, such as received from a user device 500, are coupled via respective matching resistors R1 and R2 to first terminals of respective left and right speaker drivers (the second terminals of the speaker drivers being coupled to ground), and to respective input terminals of a differential amplifier (e.g., +/− terminals of an differential/operational amplifier circuit). Assuming standard 50 Ohm audio impedance matching, resistors R1 and R2 are each 50 Ohm resistors, though other values may be used as long as R1 is substantially equal to R2. More generally, resistors R1 and R2 are selected to ensure that each of the left and right channel paths is associated with a substantially similar impedance (i.e., RLC impedance).

The output signal $V_{out}$ of the differential amplifier is equal to $\alpha$(Lin−Rin)+(Lout−Rout), where $\alpha$ is a scaling factor. The input signals $V_{in}$left(t) and $V_{in}$right(t) are known, since they are the analog output signals corresponding to the digital audio signals of the audio/media source being processed by the user device.

The output signal $V_{out}$ of the amplifier also includes a reflection signals $V_{out}$left(t) and $V_{out}$right(t) received from the left and right driver circuits and including the excitation energy acquired from the respective left and right headphone speakers.

Given that an output reflection signal of Lout−Rout is very small and may be ignored, the scaling factor $\alpha$ may be determined by cross correlation between a difference between the input signals (i.e., $V_{in}$left(t)−$V_{in}$right(t)) and the output signal Vout(t).

That is, $\alpha$($V_{in}$left(t)−$V_{in}$right(t)) may be subtracted from the output reflection signal ($V_{out}$left(t)−$V_{out}$right(t)) when stereo audio/music is playing.

This processing step may be performed using the various processing capabilities of the user device 500.

Figure 10:
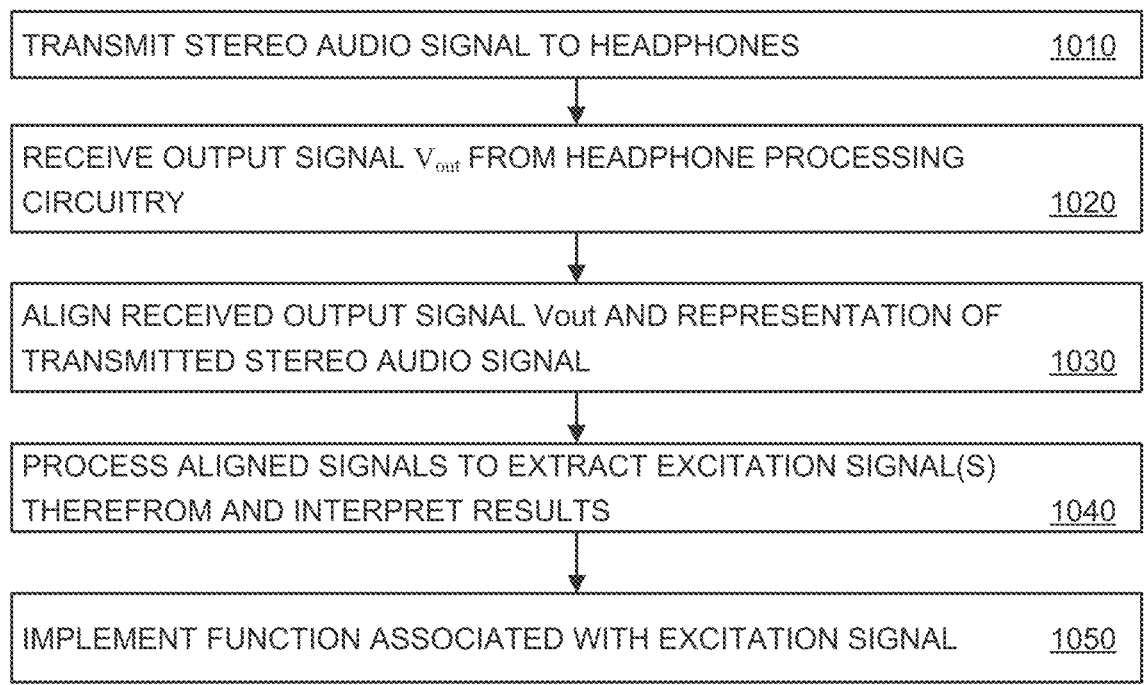
FIG. 10 depicts a flow diagram of a method according to an embodiment.

FIG. 10 depicts a flow diagram of a method according to an embodiment. Specifically, FIG. 10 depicts a flow diagram of a method 1000 of processing an output signal $V_{out}$ of the amplifier of the apparatus of FIG. 9 to extract therefrom excitation energy acquired from the respective left and right headphone speakers such as discussed herein with respect to the various embodiments.

At step 1010, a user device 500 transmits stereo audio signals to the apparatus 900 of FIG. 9, such as a pair of user headphones including such apparatus. That is, at step 1010 the audio input signals $V_{in}$left(t) and $V_{in}$right(t) are provided to the apparatus 900 of FIG. 9.

At step 1020, the output signal $V_{out}$ of the apparatus 900 of FIG. 9 is received by the user device 500. That is, the user device 500 receives a signal $V_{out}$ including the reflection signals $V_{out}$left(t) and $V_{out}$right(t) received from the left and right driver circuits and including the excitation energy acquired from the respective left and right headphone speakers.

At step 1030, the various components of the received signal $V_{out}$ and a representation of the initially transmitted audio signals are aligned to enable the various comparison and processing steps described herein. The alignment may include analog or digital processing so as to provide temporal alignment, phase alignment, gain alignment and so on to provide one or both of analog or digital representations of the various signals to enable further processing by the user device 500, such as via the audio processing capability described above.

At step 1040, the aligned signals are processed to extract thereby the excitation signal(s) from the received signal $V_{out}$, and to interpret the results to identify the information provided thereby, such as voice information (voice detection), gesture information (gesture detection), unique human identification information (user identification), heart rate and/or breathing rate information (user physiological information) and so on, advantageously while the user is able to listen to the provided audio/music via the headphones.

The audio I/O interface 537, audio processing module 534-APM or similar function of the user device 500 or other audio processing module/device may perform various DSP processing functions, computing functions, data manipulation functions and the like such as described herein to interpret and otherwise act upon the information provided by the excitation signal. Such functions may be part of or associated with other functions/applications being executed by the user device 500 or other audio processing module/device, such as communications apps, health monitoring apps, authentication apps and the like.

At step 1050, the function associated with the interpreted excitation signal is implemented, such as described above with respect to step 650 of FIG. 6.

The method of steps 1010-1050 may be continually repeated to continually receive any available excitation signals from the differencing/differential circuit of the apparatus.

Figure 11:
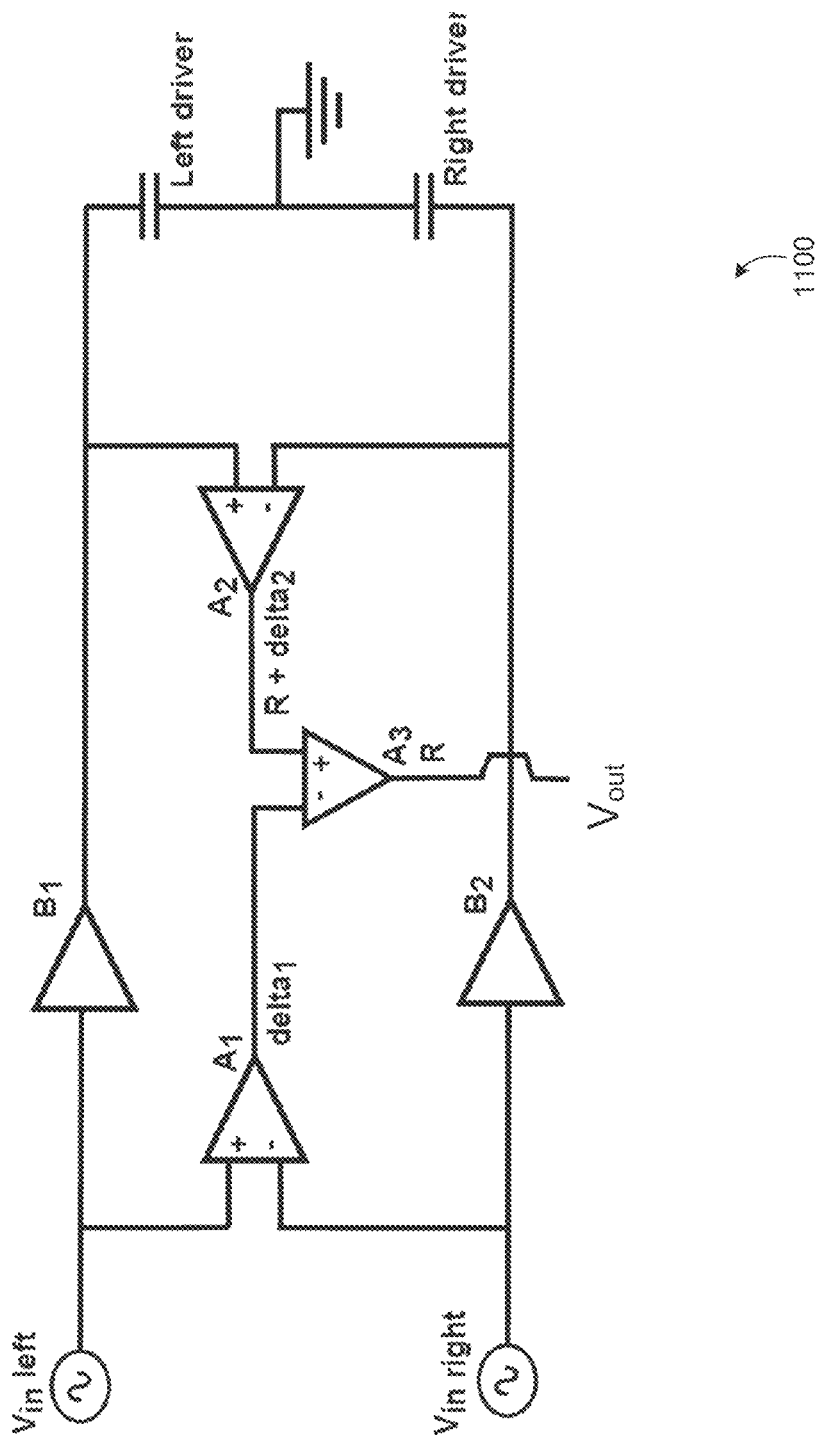
FIG. 11 depicts a schematic representation of an apparatus according to an embodiment.

FIG. 11 depicts a schematic representation of an apparatus according to an embodiment. Specifically, FIG. 11 depicts an excitation signal detector 1100 coupled to receive audio signals from a stereo audio source (e.g., stereo audio output signals of a user device 500 of FIG. 5 such as via a 3.5 mm plug, universal serial bus (USB), uUSB, USB-C, Lightning or other connector), wherein the received audio signals are used to drive respective left and right headphone speakers so as to present audio signal to a user via left and right headphone speakers while also acquiring excitation energy from the respective left and right headphone speakers, the acquired excitation energy is being retrieved via a differencing or differential amplifier circuit and provided as an output signal Out suitable for further processing as discussed herein.

Referring to FIG. 11, left ($V_{in}$left) and right ($V_{in}$right) audio input signals, such as received from a user device 500, are coupled to input terminals of respective left and right unity gain buffers B1 and B2, as well as respective input terminals of a first differential amplifier A1 (e.g., +/− terminals of a differential/operational amplifier circuit).

The output signal of the first differential amplifier A1 is equal to the difference between the left and right input signals:

$$A1_{out} = V_{in}\text{left}(t) - V_{in}\text{right}(t).$$

Output terminals of left and right buffers B1 and B2 are coupled to first terminal of respective left and right speaker drivers (the second terminals of the speaker drivers being coupled to ground), as well as respective input terminals of a second differential amplifier A2.

The output signal of the second differential amplifier A2 is equal to the difference between the buffered left and right input signals, including the reflection signals Rleft and Rright:

$$A2_{out} = B(V_{in}\text{left}(t)) - B(V_{in}\text{right}(t)) + \text{Rleft}(t) - \text{Rright}(t).$$

Output terminals of the first differential amplifier A1 and second differential amplifier A2 are connected to respective input terminals of a third differential amplifier A3.

The output signal $V_{out}$ of the third differential amplifier is equal to the difference between the second and first differential amplifier output signals, which is approximately equal to the reflection signals from the speaker diaphragms (i.e., the left and right excitation signals):

$$A3_{out} = A2_{out} - A1_{out}$$

$$A3_{out} = (B(V_{in}\text{left}(t)) - B(V_{in}\text{right}(t)) + \text{Rleft}(t) - \text{Rright}(t)) - V_{in}\text{left}(t) - V_{in}\text{right}(t)$$

$$A3_{out} = \text{Rleft}(t) - \text{Rright}(t)$$

Therefore, within the context of the apparatus 1100 of FIG. 11, the output signal $V_{out}$ of the third differential amplifier A3 may be processed by the user device 500 as an analog representation of the excitation signal(s) derived from the user.

Figure 12:
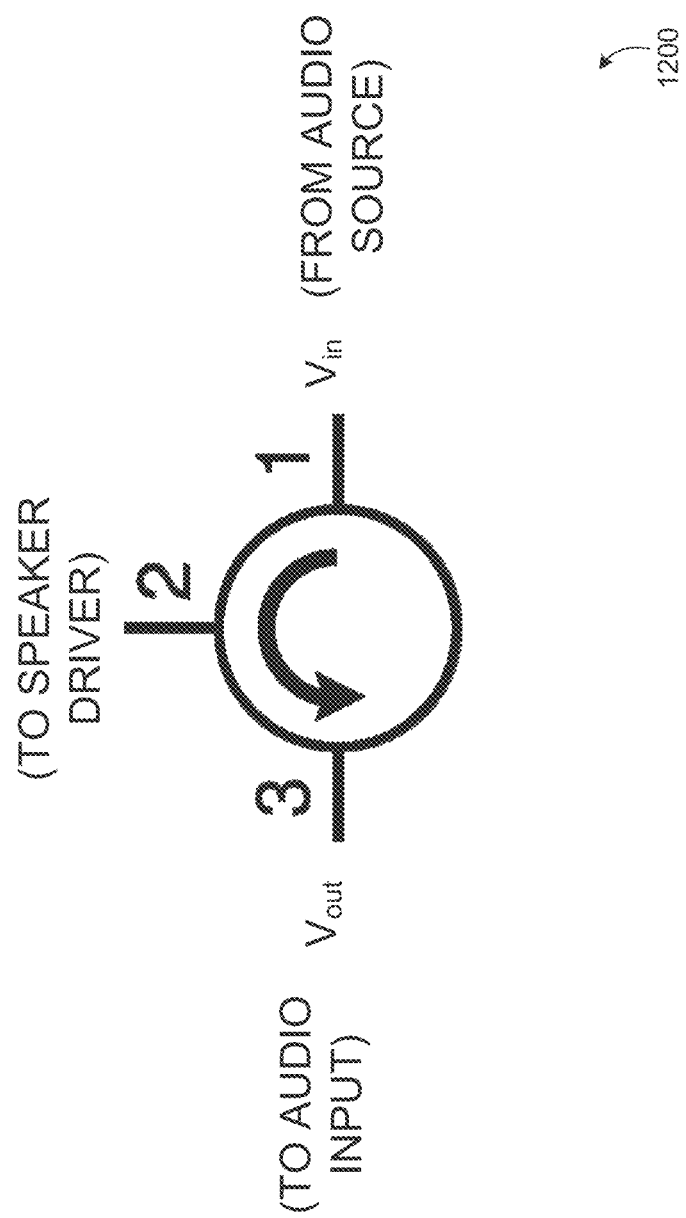
FIG. 12 depicts a schematic representation of an apparatus according to an embodiment.

FIG. 12 depicts a schematic representation of an apparatus suitable for use in various embodiment. Specifically, FIG. 12 depicts headphone circuitry suitable for use in replacing the various signal conditioning/processing circuitry discussed above with respect to the various embodiments; namely, a 3-port audio frequency circulator.

A first port of the circulator is configured to receive an audio signal from an audio source, such as a left ($V_{in}$left) or right ($V_{in}$right) audio input signal received from a user device 500. The input audio signal received at the first port is output via a second port, which is connected to speaker driver circuit. The speaker driver circuit also provides excitation energy/signal from the speaker as an input signal to the second port. The excitation energy/signal received at the second port is output via a third port as an output signal Vout, which is connected to an audio input such as a microphone of a user device 500.

The apparatus of FIG. 12 may be used to replace other circuitry described herein so as to avoid or minimize the use of the Wheatstone Bridge, nulling circuit, differential amplifiers, and the like as described above.

In this manner, apparatus according to the various embodiments may comprise stereo headphones configured to provide a sensing platform wherein one or more headphone drivers are used to derive excitation energy from the speaker diaphragms they electrically cooperate with. The various embodiments may be used to interpret received excitation signal(s) to identify therein voice information (voice detection), gesture information (gesture detection), unique human identification information (user identification), heart rate and/or breathing rate information (physiological monitoring) and so on. In this manner, new applications are provided within the context of mobile health, user interface, context-awareness, identification/authentication and the like.

Aspects of various embodiments are specified in the claims. Those and other aspects of at least a subset of the various embodiments are specified in the following numbered clauses:

1. An apparatus for receiving information from a headset, the headset comprising a magnetic coil driver operatively coupled to a diaphragm, the magnetic coil driver configured to receive an audio input signal and responsively cause the diaphragm to generate air vibrations corresponding to the audio input signal, the apparatus comprising: a nulling circuit, configured for selective coupling to the magnetic coil driver, for nulling electrical energy associated with the audio input signal to provide thereby an output signal primarily comprising electrical energy associated with an excitation signal generated by the magnetic coil driver in response to external pressures imparted to the diaphragm; and an amplifier circuit, for amplifying the nulling circuit output signal to provide thereby an excitation signal configured to enable determination of the external pressures imparted to the diaphragm.

2. The apparatus of clause 1, wherein the nulling circuit comprises a Wheatstone bridge including two balanced voltage divider arms, wherein one of the voltage divider arms includes the least one magnetic coil operatively coupled to the diaphragm.

3. The apparatus of clause 1, wherein the headset further comprises a second magnetic coil driver operatively coupled to a second diaphragm, the second magnetic coil driver configured to receive the audio input signal and responsively cause the second diaphragm to generate air vibrations corresponding to the audio input signal, wherein the first and second magnetic coil drivers exhibit a substantially similar impedance; and the nulling circuit comprises a Wheatstone bridge including two balanced voltage divider arms, each voltage divider arm including a respective one of the magnetic coil drivers.

4. The apparatus of clause 1, wherein the headset is configured for connection to an audio output device, and the apparatus is configured to be connected to both the headset and the audio output device.

5. The apparatus of clause 1, wherein the headset is configured for connection to a user device, and the apparatus is configured to be connected to both the headset and the user device.

6. The apparatus of clause 2, wherein the excitation signal includes audio signal caused by external pressures imparted to the diaphragm from vocal utterances of a wearer of the headphones.

7. The apparatus of clause 1, wherein the excitation signal includes audio signal caused by external pressures imparted to the diaphragm from nominal pressures associated with an ear canal geometry of a wearer of the headphones.

8. The apparatus of clause 1, wherein the excitation signal includes audio signal caused by external pressures imparted to the diaphragm from repetitive pressure changes associated with a beating heart of a wearer of the headphones.

9. The apparatus of clause 1, wherein said apparatus further comprises an enclosure configured for mechanically supporting the nulling circuit and amplifier circuit, the enclosure having disposed thereon a first headphone connector configured to provide electromechanical cooperation between the apparatus and a headphone device, and a second headphone connector configured to provide electromechanical cooperation between the apparatus and a user device.

10. The apparatus of clause 9, wherein first and second headphone connectors comprise at least one of a 3.5 mm plug, a universal serial bus (USB) connector, a micro USB connector, a USB-C connector, and a Lightning connector.

11. The apparatus of clause 1, wherein said apparatus is included within a user device.

12. The apparatus of clause 5, wherein said user device, in an authentication interpretation mode of operation, causes an audio chirp signal to be propagated to the headphones to induce thereby an excitation signal indicative of an inner ear structure of a headphone wearer.

13. The apparatus of clause 5, wherein said user device, in a gesture interpretation mode of operation, monitors an excitation signal to derive therefrom user gesture input suitable for use in adapting a function of the user device.

14. The apparatus of clause 5, wherein said user device, in a voice interpretation mode of operation, monitors an excitation signal to derive therefrom user voice input suitable for use in adapting a function of the user device.

15. The apparatus of clause 1, the headset further comprising a second magnetic coil driver operatively coupled to a second diaphragm, the second magnetic coil driver configured to receive a second audio input signal and responsively cause the second diaphragm to generate air vibrations corresponding to the second audio input signal, the apparatus further comprising: a second nulling circuit, configured for selective coupling to the second magnetic coil driver, for nulling electrical energy associated with the second audio input signal to provide thereby a second output signal primarily comprising electrical energy associated with an excitation signal generated by the second magnetic coil driver in response to external pressures imparted to the second diaphragm; and a second amplifier circuit, for amplifying the second nulling circuit output signal to provide thereby a second excitation signal configured to enable determination of the external pressures imparted to the second diaphragm.

16. The apparatus of clause 1, the headset further comprising a second magnetic coil driver operatively coupled to a second diaphragm, the second magnetic coil driver configured to receive a second audio input signal and responsively cause the second diaphragm to generate air vibrations corresponding to the second audio input signal, wherein: the nulling circuit comprises a first differential amplifier configured amplifying a difference between the first and second audio input signals, and a second differential amplifier configured for amplifying a difference between excitation signals generated by first and second magnetic coil drivers; and the amplifier circuit comprises a third differential amplifier configured to amplify a difference between output signals of the first and second differential amplifiers.

17. The apparatus of clause 16, further comprising: a first buffer, configured to provide a buffered first audio signal to the first magnetic coil driver; and a second buffer, configured to provide a buffered second audio signal to the second magnetic coil driver.

18. The apparatus of clause 16, wherein the nulling and amplifying circuits together comprise a three-port circulator having a first port configured to receive an audio input signal, a second port configured to provide an audio signal to the magnetic coil driver and to receive from the magnetic coil driver electrical energy associated with an excitation signal, and a third port configured to provide the excitation signal configured to enable determination of the external pressures imparted to the diaphragm.

19. A method for receiving information from a headset, the headset comprising a magnetic coil driver operatively coupled to a diaphragm, the magnetic coil driver configured to receive an audio input signal and responsively cause the diaphragm to generate air vibrations corresponding to the audio input signal, the method comprising:

nulling electrical energy associated with the audio input signal to provide thereby an output signal primarily comprising electrical energy associated with an excitation signal generated by the magnetic coil driver in response to external pressures imparted to the diaphragm; and amplifying the nulling circuit output signal to provide thereby an excitation signal configured to enable determination of the external pressures imparted to the diaphragm.

20. The method of clause 19, further comprising: in an authentication interpretation mode of operation, causing an audio chirp signal to be propagated to the headphones; and interpreting a received excitation signal to determine thereby a profile of an inner ear structure of a headphone wearer.

21. The method of clause 19, further comprising:
in a gesture interpretation mode of operation, monitoring a received excitation signal to derive therefrom user gesture input suitable for use in adapting a function of a user device.

22. The method of clause 19, further comprising: in a voice interpretation mode of operation, monitoring a received excitation signal to derive therefrom user voice input suitable for use in adapting a function of a user device.

23. The method of clause 19, further comprising:
in a physiological interpretation mode of operation, monitoring a received excitation signal to derive therefrom repetitive physiological information of the headphone user suitable for use in adapting a function of a user device.

24. The method of clause 23, wherein said repetitive physiological information comprises physiological information associated with one or both of heartbeat and breathing information.

25. The method of clause 19, further comprising: in a physiological interpretation mode of operation, monitoring a received excitation signal to derive therefrom physiological information of the headphone user suitable for use in adapting a function of a user device, said physiological information associated with one or more of micro-seizures, thermal shivering, jaw clenching, and blood pressure.

26. The method of clause 19, further comprising: in a noise interpretation mode of operation, monitoring a received excitation signal to derive therefrom an ambient noise voice input suitable for use in generating a corresponding noise cancelling signal.

27. The method of clause 19, further comprising: in a noise interpretation mode of operation, monitoring received excitation signals from each of a left and right headphone driver to derive therefrom respective ambient noise input signals, and determining that a difference in respective ambient noise levels above a threshold amount indicates an improper sealing of the headphone associated with the headphone driver exhibiting the larger ambient noise level.

28. An apparatus for receiving information from a headset, the headset comprising first and second speaker diaphragms coupled to respective first and second magnetic coil drivers, the apparatus comprising: a first differential amplifier configured amplifying a difference between first and second received audio input signals; a second differential amplifier configured for amplifying a difference between excitation signals generated by the first and second magnetic coil drivers; and a third differential amplifier configured to amplify a difference between output signals of the first and second differential amplifiers to provide thereby an output signal primarily comprising electrical energy associated with excitation signal generated by the magnetic coil drivers in response to external pressures imparted to the speaker diaphragms, the output signal configured for processing by a computing device.

29. The apparatus of clause 28, further comprising: a first buffer, configured to provide a buffered first audio signal to the first magnetic coil driver; and a second buffer, configured to provide a buffered second audio signal to the second magnetic coil driver.

30. An apparatus for receiving information from a headset, the headset comprising first and second speaker diaphragms coupled to respective first and second magnetic coil drivers, the apparatus comprising: first and second matching resistors for coupling first and second audio input signals to respective first and second magnetic coil speaker diaphragm drivers and to respective first and second input terminals of an amplifier; the amplifier configured to generate an output signal indicative of a difference between the first and second audio input signals and between electrical energy associated with excitation signals generated by the first and second magnetic coil speaker diaphragm drivers in response to external pressures imparted to the respective first and second speaker diaphragms; wherein the output signal is configured for processing by a computing device to null signal associated with the first and second audio input signals and extract signal associated with the magnetic coil speaker diaphragm drivers.

Various embodiments may be implemented as a plug-in peripheral connecting the headphones and pairing device (e.g., a user device such as a smartphone or computer), or as an integrated circuit embedded into headphones or into a pairing device.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. An apparatus configured to couple a first audio input signal to a headset having a first
    magnetic coil driver operatively coupled to a first diaphragm to responsively generate thereby first audible sound for a headset wearer while receiving from the first magnetic coil a first excitation signal generated thereby in response to external pressures imparted to the first diaphragm, the apparatus comprising:
  a Wheatstone bridge including two balanced voltage divider arms, a first of the voltage divider arms including the first magnetic coil driver of the headset and providing the first audio input signal thereto, the Wheatstone bridge nulling electrical energy associated with the audio input signal to provide thereby an output signal primarily comprising electrical energy associated with an excitation signal generated by the first magnetic coil driver in response to external pressures imparted to the first diaphragm; and
  an amplifier circuit, for amplifying the Wheatstone bridge output signal to provide thereby the first excitation signal configured to enable determination of the external pressures imparted to the diaphragm.

2. The apparatus of claim 1, further configured to couple a second audio input signal to the headset, the headset further comprising a second magnetic coil driver operatively coupled to a second diaphragm to responsively generate thereby second audible sound for a headset wearer while receiving from the second magnetic coil a second excitation signal generated thereby in response to external pressures imparted to the second diaphragm, the apparatus further comprising:
  a second Wheatstone bridge including two balanced voltage divider arms, a first of the voltage divider arms including the second magnetic coil driver of the headset and providing the second audio input signal thereto, the Wheatstone bridge nulling electrical energy associated with the second audio input signal to provide thereby an output signal primarily comprising electrical energy associated with an excitation signal generated by the second magnetic coil driver in response to external pressures imparted to the second diaphragm; and
  an amplifier circuit, for amplifying the Wheatstone bridge output signal to provide thereby a second excitation signal configured to enable determination of the external pressures imparted to the diaphragm.

3. The apparatus of claim 1, wherein the headset is configured for connection to an audio output device, and the apparatus is configured to be connected to both the headset and the audio output device.

4. The apparatus of claim 1, wherein the headset is configured for connection to a user device, and the apparatus is configured to be connected to both the headset and the user device.

5. The apparatus of claim 1, wherein the excitation signal includes audio signal caused by external pressures imparted to the diaphragm from vocal utterances of a wearer of the headset.

6. The apparatus of claim 1, wherein the excitation signal includes audio signal caused by external pressures imparted to the diaphragm from nominal pressures associated with an ear canal geometry of a wearer of the headset.

7. The apparatus of claim 1, wherein the excitation signal includes audio signal caused by external pressures imparted to the diaphragm from repetitive pressure changes associated with a beating heart of a wearer of the headset.

8. The apparatus of claim 1, wherein said apparatus further comprises an enclosure configured for mechanically supporting the Wheatstone bridge and amplifier circuit, the enclosure having disposed thereon a first headset connector configured to provide electromechanical cooperation between the apparatus and a headset device, and a second headset connector configured to provide electromechanical cooperation between the apparatus and a user device.

9. The apparatus of claim 8, wherein first and second headset connectors comprise at least one of a 3.5 mm plug, a universal serial bus (USB) connector, a micro-USB connector, a USB-C connector, and a Lightning connector.

10. The apparatus of claim 1, wherein said apparatus is included within a user device.

11. The apparatus of claim 4, wherein said user device, in an authentication interpretation mode of operation, causes an audio chirp signal to be propagated to the headset to induce thereby an excitation signal indicative of an inner ear structure of a headset wearer.

12. The apparatus of claim 4, wherein said user device, in a gesture interpretation mode of operation, monitors an excitation signal to derive therefrom user gesture input suitable for use in adapting a function of the user device.

13. The apparatus of claim 4, wherein said user device, in a voice interpretation mode of operation, monitors an excitation signal to derive therefrom user voice input suitable for use in adapting a function of the user device.

14. The apparatus of claim 2, wherein the first and second magnetic coil drivers exhibit a substantially similar impedance.

15. The apparatus of claim 1, further comprising:
a first differential amplifier configured amplifying a difference between the first and second audio input signals, and a second differential amplifier configured for amplifying a difference between the first and second excitation signals;
wherein the amplifier circuit comprises a third differential amplifier configured to amplify a difference between output signals of the first and second differential amplifiers.

16. The apparatus of claim 15, further comprising:
a first buffer, configured to provide a buffered first audio signal to the first magnetic coil driver; and
a second buffer, configured to provide a buffered second audio signal to the second magnetic coil driver.

17. The apparatus of claim 15, wherein the amplifying circuits together comprise a three-port circulator having a first port configured to receive audio input signal, a second port configured to provide audio input signal to the magnetic coil driver and to receive from the magnetic coil driver electrical energy associated with excitation signal, and a third port configured to provide amplified excitation signal.

18. A method for coupling an audio input signal to a headset having a magnetic coil driver operatively coupled to a diaphragm to responsively generate thereby audible sound for a headset wearer while receiving from the magnetic coil an excitation signal generated thereby in response to external pressures imparted to the diaphragm, the method comprising:
providing the audio input signal to the magnetic coil driver of the headset via a Wheatstone bridge including two balanced voltage divider arms, a first of the voltage divider arms including the magnetic coil driver of the headset;
receiving an output signal of the Wheatstone bridge, the Wheatstone bridge nulling electrical energy associated with the audio input signal to provide thereby an output signal primarily comprising electrical energy associated with an excitation signal generated by the magnetic coil driver in response to external pressures imparted to the diaphragm; and
amplifying the Wheatstone bridge output signal to provide thereby the excitation signal configured to enable determination of the external pressures imparted to the diaphragm.

19. The method of claim 18, further comprising:
in an authentication interpretation mode of operation, causing an audio chirp signal to be propagated to the headset; and
interpreting a received excitation signal to determine thereby a profile of an inner ear structure of a headset wearer.

20. The method of claim 18, further comprising:
in a gesture interpretation mode of operation, monitoring a received excitation signal to derive therefrom user gesture input suitable for use in adapting a function of a user device.

21. The method of claim 18, further comprising:
in a voice interpretation mode of operation, monitoring a received excitation signal to derive therefrom user voice input suitable for use in adapting a function of a user device.

22. The method of claim 18, further comprising:
in a physiological interpretation mode of operation, monitoring a received excitation signal to derive therefrom repetitive physiological information of the headset user suitable for use in adapting a function of a user device.

23. The method of claim 22, wherein said repetitive physiological information comprises physiological information associated with one or both of heartbeat and breathing information.

24. The method of claim 18, further comprising:
in a physiological interpretation mode of operation, monitoring a received excitation signal to derive therefrom physiological information of the headset user suitable for use in adapting a function of a user device, said physiological information associated with one or more of micro-seizures, thermal shivering, jaw clenching, and blood pressure.

25. The method of claim 18, further comprising:
in a noise interpretation mode of operation, monitoring a received excitation signal to derive therefrom an ambient noise voice input suitable for use in generating a corresponding noise cancelling signal.

26. The method of claim 18, further comprising:
in a noise interpretation mode of operation, monitoring received excitation signals from each of a left and right headset driver to derive therefrom respective ambient noise input signals, and determining that a difference in respective ambient noise levels above a threshold amount indicates an improper sealing of the headset associated with the headset driver exhibiting the larger ambient noise level.

* * * * *